United States Patent Office 3,570,004
Patented Mar. 9, 1971

3,570,004
APPARATUS USING MAGNETIC REED SWITCHES FOR MONITORING THE OPERATION OF A SPOT-WELDING MACHINE
Hendrik J. de Jong, Hilversum, Netherlands, assignor to U.S. Philips Corporation, New York, N.Y.
Continuation of application Ser. No. 685,025, Nov. 22, 1967. This application Jan. 30, 1968, Ser. No. 701,754
Claims priority, application Netherlands, Nov. 24, 1966, 6616539
Int. Cl. G01r 19/16
U.S. Cl. 324—103
7 Claims

ABSTRACT OF THE DISCLOSURE

Apparatus for monitoring the current in a spot welding machine includes a magnetic reed switch responsive to the magnetic field produced by the welding current. The reed switch operates a trigger circuit which, in turn, operates a signal lamp.

Figure 1:
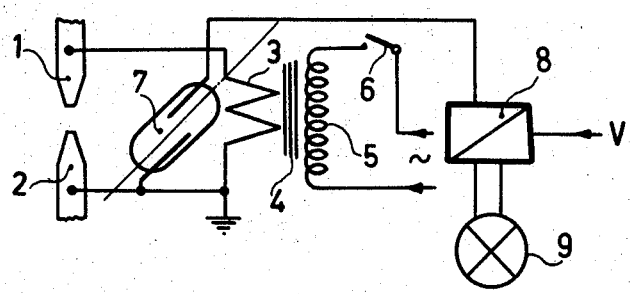

This is a continuation of application Ser. No. 685,025, filed Nov. 22, 1967 and now abandoned.

This invention relates to apparatus for monitoring a spot welding machine, and more particularly to welding control apparatus utilizing magnetic reed switches.

With a view to the quality of the products manufactured by means of spot-welding machines, it is very desirable to check the satisfactory operation of the spot-welding machines at each spot weld. However, the checking apparatuses developed for this purpose are expensive and voluminous, so that they are not suitable in practice to be provided on each spot-welding machine, for example, of a production belt having a large number of comparatively small and simple spot-welding machines.

An object of the invention is to provide a simple and cheap arrangement for checking the operation of a spot-welding machine which occupies little space and which can be used very advantageously on any, even the smallest and simplest, spot-welding machine.

The arrangement according to the invention is characterised in that it comprises at least one reed contact controllable by a magnetic field and which is arranged within the range of the welding-current loop of the spot-welding machine so that it can be rendered operative by the magnetic field produced by the welding-current, in combination with a source of electric voltage and a trigger circuit controlled by voltage pulses applied to it from this source through the reed contact.

Figure 2:
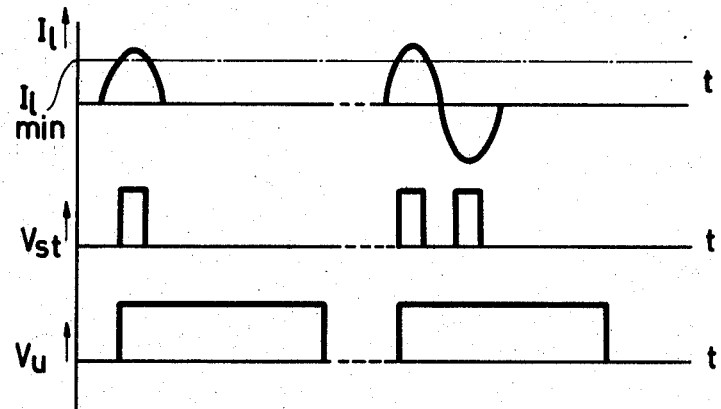
Figure 3:
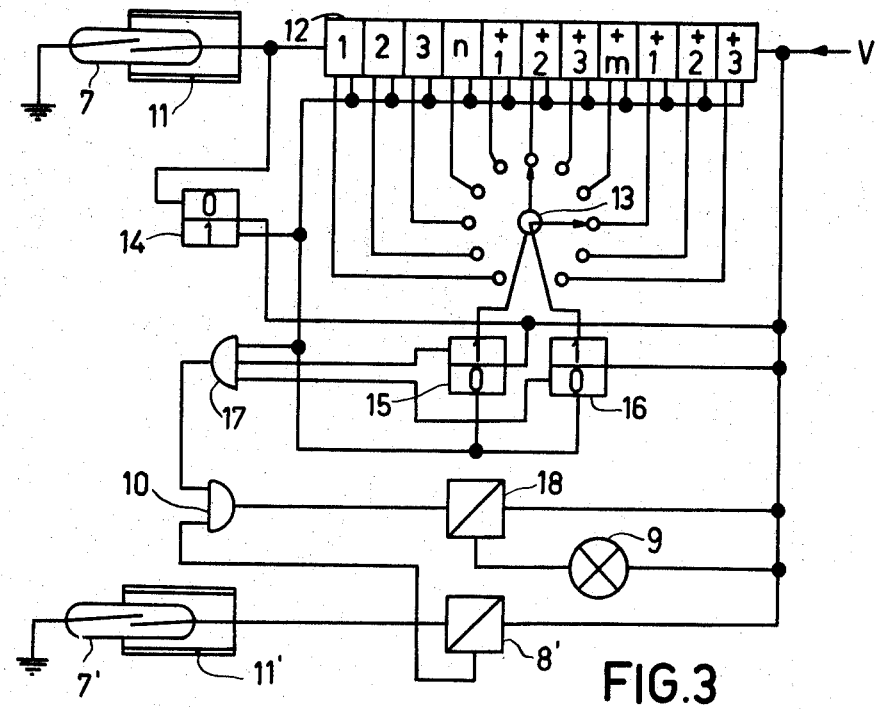
Figure 4:
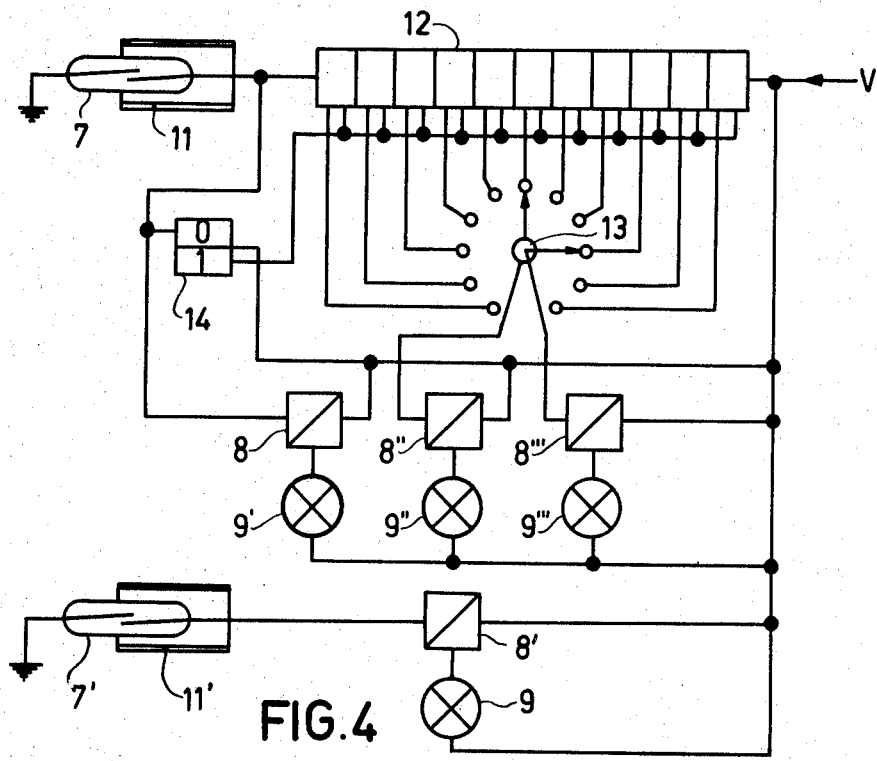

The arrangement according to the invention will be described more fully with reference to the drawing, in which:

FIG. 1 shows diagrammatically a particularly simple embodiment of the arrangement according to the invention, FIG. 2 shows time diagrams for explaining the operation of the embodiment of FIG. 1, FIG. 3 shows a second embodiment of the invention, and FIG. 4 shows a third embodiment of the invention.

In FIG. 1, a spot-welding machine is represented diagrammatically by two welding electrodes 1 and 2 connected to the ends of the secondary winding 3 of a welding transformer 4, the primary winding 5 of which is connected to an alternating current supply through a switch 6. The operation of the spot-welding machine is checked by means of an arrangement according to the invention including a reed contact 7 controllable by a magnetic field and which is arranged within the range of the welding-current loop 1, 2, 3 of the spot-welding machine, so that it can be rendered operative by the magnetic field produced by the welding-current $I_L$. The arrangement further comprises a source of electric voltage V, a trigger circuit 8 controlled by voltage pulses $V_{St}$ applied to it from this source through the reed contact 7, and an indicating member constituted by an electric signalling lamp 9.

The upper line of FIG. 2 shows a shortest welding-current pulse of a half cycle of the A.C. supply and a slightly longer welding-current pulse of two successive half cycles.

The reed contact 7 is transiently closed during each half cycle of the welding-current if the latter exceeds a predetermined minimum value. This can be achieved by a suitable choice of the position of the longitudinal axis of the reed contact with respect to a plane containing the welding-current loops 1, 2, 3 and/or of the distance between the reed contact and said plane. However, the sensitivity of the reed contact to disturbing magnetic fields is then not reduced so that the risk of this contact being actuated by a disturbing field is not reduced. Therefore, the sensitivity of the reed contact is preferably reduced by surrounding it partly by a magnetic screen (not shown) slipped over it. Its sensitivity may then be varied and adjusted in a very simple manner by displacing this screen made of a material having a considerable magnetic permeability.

The second line of FIG. 2 shows the voltage pulses $V_{St}$ produced by the reed contact 7 and the voltage source V during each half cycle of the welding-current of sufficient amplitude.

The trigger circuit 8 is a monostable trigger circuit, for example, a Schmitt trigger circuit, or a relay having a make contact through which a capacitor is rapidly charged by the voltage source V, this capacitor then being slowly discharged through the energizing winding of the relay. It has a large time constant of, for example, 1 second with respect to a half cycle of the supply voltage and passes corresponding long voltage pulses on to the signalling lamp 9, as represented by $V_u$ on the third line of FIG. 2. Each time a welding-current pulse of sufficient amplitude flows through the loops 1, 2, 3, the signalling lamp 9 lights up during periods which correspond to the voltage pulses $V_u$ but which are slightly shorter, independently of the number of half cycles passed by the switch 6, which number is determined by a known timing pulse generator (not shown) synchronized with the supply frequency.

Instead of lighting up a signalling lamp, or concurrently, the $V_u$ pulses can be applied to the input of an "and-not" gate to the other input of which voltage pulses produced by the closing of the switch 6 are applied. This gate in turn controls a trigger circuit which switches the machine off when the switch 6 is closed without a $V_u$ pulse being produced.

By lighting up the lamp illuminates or not switching-off the machine, the simple checking arrangement of FIG. 1 only provides the certainty that a current pulse having an amplitude larger than or equal to a minimum value $I_{L\ min}$ has passed through the welding-current loops 1, 2, 3. By using two reed contacts, more information can be provided about each welding operation carried out. In the second embodiment shown in FIG. 3, the arrangement includes a first reed contact 7 which is partly surrounded by a magnetic screen 11 slipped over it, the latter having the form of a hollow cylinder open at its lower end and made of a material having a considerable magnetic permeability, for example, of transformer sheet metal. The required minimum value $I_{L\ min}$ of the amplitude of the welding-current pulses can readily be adjusted by displacing the screen 11 with respect to the reed contact 7. The control pulses $V_{St}$ produced by the reed contact 7 and the voltage source V are applied to the input trigger or stage of a counter 12 which is designed to supply an output pulse $V_u$ only if the number of control pulses $V_{St}$ of an uninterrupted train is larger than a pre-determined adjustable number and smaller than a larger pre-determined and adjustable number. The $V_u$ pulses from the counter 12 are applied to a signalling lamp 9 through an "and-not" gate 10.

In FIG. 3, element 12 is the counter proper controlled from the reed contact 7, fed from voltage source V and reset by a monostable multivibrator 14.

A double count selector 13 is connected to the output of counter 12.

The monostable multivibrator 14 is designed to be kept in its astable state until after the last pulse supplied to it from the reed-contact 7.

Bistable multivibrators 15 and 16 are arranged to be triggered into their respective 1 state by the $n^{th}$ and $n+m^{th}$ stage of the counter 12, respectively, and to be reset in their 0 state, as the counter 12, by the monostable multivibrator 14, when the same returns to its stable state 0. Multivibrators 15 and 16 are in turn connected to an AND gate 17.

The "And" gate 17 is connected via gate 10, to a trigger circuit 18 similar to trigger circuit 8 of FIG. 1.

The arrangement includes a second reed contact 7' having a screen 11' which renders it less sensitive to the magnetic field than the reed contact 7. This second reed contact controls, together with the voltage source V, a monostable trigger circuit 8', from which a voltage pulse $V_u'$ is applied to the second input of the gate 10 if the amplitude of a welding-current pulse exceeds a predetermined and adjustable maximum value. The amplitude of this pulse $V_u'$ is chosen so that it can out off the gate 10, but it cannot cause the lamp 9 to light up. Consequently, the lamp 9 only lights up if a spot-welding operation is carried out with the predetermined number of half cycles of the predetermined amplitude, the required number lying between two adjustable numbers and the required amplitude lying between two adjustable values.

Also in this embodiment, the signalling lamp 9 can be replaced by a circuit arrangement for automatically switching-off the machine when a fault occurs, or such a circuit arrangement can be connected to the gate 10 concurrently with the signalling lamp 9.

A variant of the embodiment of FIG. 3 is shown in FIG. 4 and offers the possibility of identifying a fault (unduly small or unduly large current amplitude or unduly small or unduly large number of half cycles). For this purpose, three signalling lamps are controlled by the counter 12: a first lamp 9' by the first pulse $V_{St}$ from the read contact 7, a second lamp 9" by the $n^{th}$ pulse and a third lamp 9'" by the $n+m^{th}$ pulse. On the other hand, the signalling lamp 9 is directly and exclusively controlled by the trigger circuit 8'.

If the welding-current amplitude is unduly large, the lamp 9 lights up and if it is unduly small, none of the lamps 9', 9" and 9'" lights up. If the number of half cycles is unduly small, only the lamp 9' lights up and if it is unduly large, the three lamps 9', 9" and 9'" light up. If the spot-welding operation is carried out in the required manner with a number of half cycles lying between $n$ and $n+m$, only the lamps 9' and 9" light up.

Like the trigger circuit 8 of FIG. 1, the trigger circuit 8', the counter 12 and the elements 10 and 14 to 18 of FIG. 3 or the trigger circuits 8, 8', 8" and 8'", the counter 12 and the elements 14 of FIG. 4 can be constructed both with electronic means or with electromagnetic relays and the modern logic-circuits technology offers so many possibilities that it is not necessary to describe further possible embodiments and/or modifications.

What is claimed is:

1. Welding control apparatus for a spot welding machine having current supply conductors connected to welding electrodes and forming a welding current loop, said apparatus producing a suitable weld when the number of welding current impulses in a weld period lies in a given range above a minimum number and below a maximum number of current impulses and comprising, a magnetic reed switch arranged in the vicinity of said welding current loop so as to be actuated by the magnetic field produced by the welding current only if the welding current exceeds a predetermined minimum value required to produce a suitable weld, means for supplying welding current impulses to said supply conductors, a source of electric voltage, signalling means for said spot welding machine, a trigger circuit coupled to said signalling means so as to control the operation thereof, and circuit means interconnecting said voltage source and said magnetic reed switch with said trigger circuit so that the trigger circuit is controlled by voltage pulses applied to it from said voltage source via the reed switch, said interconnecting circuit means including means coupled to said reed switch and responsive to the number of welding current impulses exceeding said predetermined value during a weld period for operating said trigger circuit only if the number of current impulses lies within said given range, said last named means generating said voltage pulses.

2. Apparatus as claimed in claim 1 further comprising a second magnetic reed switch arranged in the vicinity of said welding current loop so as to be actuated only if the welding current exceeds a predetermined maximum value, a second trigger circuit connected to said voltage source and said second reed switch so that the second trigger circuit is controlled by voltage pulses applied to it from said voltage source via the second reed switch, and means connecting the output of said second trigger circuit to said signalling means so that the signalling means is jointly controlled by said first and second reed switches.

3. Apparatus as claimed in claim 2 further comprising a magnetic sleeve for each reed switch mounted to partially surround switch and adjustable to vary the sensitivity of the reed switch to the magnetic field strength.

4. Welding control apparatus for a spot welding machine having current supply conductors connected to welding electrodes and forming a welding current loop, said apparatus comprising, a magnetic reed switch arranged in the vicinity of said welding current loop so as to be actuated by the magnetic field produced by the welding current, means for supplying welding current impulses to said supply conductors, a source of electric voltage, signalling means for said spot welding machine, a trigger circuit coupled to said signalling means so as to control the operation thereof, and circuit means interconnecting said voltage source and said magnetic reed switch with said trigger circuit so that the trigger circuit is controlled by voltage pulses applied to it from said voltage source via the reed switch, said interconnecting circuit means comprising a counter having an input coupled to said reed switch operated by said reed switch and a first output related to the minimum number of welding current impulses required to produce a suitable weld and a second output related to the maximum number of welding current impulses required to produce a suitable weld, and gating means intercoupling said first and second counter outputs with said trigger circuit and producing said voltage pulses so that said trigger circuit actuates said signalling means only if the number of welding current impulses lies in the range between said first and second counter outputs.

5. Apparatus as claimed in claim 4 further comprising a second magnetic reed switch arranged in the vicinity of said welding current loop so as to be actuated only if the welding current exceeds a predetermined maximum value, a second trigger circuit connected to said voltage source and said second reed switch so that the second trigger circuit is controlled by voltage pulses applied to it from said voltage source via the second reed switch, and means connecting the output of said second trigger circuit to an input of said gating means so that the signalling means is jointly controlled by said first and second reed switches.

6. Apparatus as claimed in claim 4 further comprising a second magnetic reed switch arranged in the vicinity of said welding current loop so as to be actuated only if the welding current exceeds a predetermined maximum value, a second trigger circuit connected to said voltage source and said second reed switch so that the second trigger circuit is controlled by voltage pulses applied to it from said voltage source via the second reed switch, and means connecting the output of said second trigger circuit to said signalling means so that the signalling means is jointly controlled by said first and second reed switches.

7. Welding control apparatus for a spot welding machine having current supply conductors connected to welding electrodes and forming a welding current loop, said apparatus comprising, a magnetic reed switch arranged in the vicinity of said welding current loop so as to be actuated by the magnetic field produced by the welding current, means for supplying welding current impulses to said supply conductors, a source of electric voltage, signalling means for said spot welding machine, a trigger circuit coupled to said signalling means so as to control the operation thereof, and circuit means interconnecting said voltage source and said magnetic reed switch with said trigger circuit so that the trigger circuit is controlled by voltage pulses applied to it from said voltage source via the reed switch, said interconnecting circuit means comprising gating circuit means having a first input to which said voltage pulses are applied via said reed switch and a second input, and means actuated when said current impulses are applied to said conductors for coupling to said second input voltage pulses that are synchronized with the welding current impulses, said gating circuit means producing the control voltage pulses in the absence of the voltage pulses at the first input.

References Cited
UNITED STATES PATENTS

| | | | |
|---|---|---|---|
| 1,938,499 | 12/1933 | Ragsdale | 219—109 |
| 2,101,108 | 12/1937 | Tarbox | 219—109 |
| 3,390,362 | 6/1968 | Hoeppel | 335—153 |
| 3,418,443 | 12/1968 | Bozeman | 219—110 |

OTHER REFERENCES

Patlach et al.: Reed Switch Overload Detector; I.B.M. Technical Disclosure Bulletin: Vol. 8, No. 1, June 1965.

RUDOLPH V. ROLINEC, Primary Examiner

R. J. CORCORAN, Assistant Examiner

U.S. Cl. X.R.

219—109; 335—151; 340—253